(12) United States Patent
Ballan et al.

(10) Patent No.: US 10,613,692 B2
(45) Date of Patent: Apr. 7, 2020

(54) TOUCH INTERACTOR

(71) Applicant: Advanced Silicon SA, Lausanne (CH)

(72) Inventors: Hussein Ballan, St-Légier (CH); Marc Pastre, Ecublens (CH); Sylvain Maréchal, Prilly (CH)

(73) Assignee: Advanced Silicon SA, Lausanne (CH)

( * ) Notice: Subject to any disclaimer, the term of this patent is extended or adjusted under 35 U.S.C. 154(b) by 0 days.

(21) Appl. No.: 15/920,721

(22) Filed: Mar. 14, 2018

(65) Prior Publication Data

US 2018/0299987 A1    Oct. 18, 2018

(30) Foreign Application Priority Data

Apr. 12, 2017   (EP) .................................... 17166156

(51) Int. Cl.
*G06F 3/044* (2006.01)
*G06F 3/039* (2013.01)
*G06F 3/041* (2006.01)
*G06F 3/0354* (2013.01)

(52) U.S. Cl.
CPC .............. *G06F 3/044* (2013.01); *G06F 3/039* (2013.01); *G06F 3/0416* (2013.01); *G06F 3/03545* (2013.01); *G06F 3/03549* (2013.01)

(58) Field of Classification Search
CPC ........ G06F 3/041; G06F 3/044; G06F 3/0213; G06F 3/033; G06F 3/0362; G06F 1/169; G06F 3/03549
See application file for complete search history.

(56) References Cited

U.S. PATENT DOCUMENTS

| | | | |
|---|---|---|---|
| 9,925,456 B1* | 3/2018 | Hershey | G06F 3/0481 |
| 2002/0036621 A1 | 3/2002 | Liu et al. | |
| 2004/0056781 A1* | 3/2004 | Rix | G06F 3/0202 341/20 |
| 2008/0029316 A1 | 2/2008 | Jaeger et al. | |
| 2008/0042993 A1 | 2/2008 | Jaeger et al. | |
| 2008/0238879 A1* | 10/2008 | Jaeger | G06F 3/03545 345/173 |

(Continued)

FOREIGN PATENT DOCUMENTS

EP    3112996 A1 *  1/2017  ........... G06F 3/0383

OTHER PUBLICATIONS

European Search Report for EP 17166156, dated Sep. 15, 2017, 10 pages.

*Primary Examiner* — Koosha Sharifi-Tafreshi
(74) *Attorney, Agent, or Firm* — Blank Rome LLP (57) ABSTRACT

The invention concerns a system comprising a touch sensor and a touch interactor, wherein the touch sensor comprises a touch sensitive surface configured to detect the position of a touch of an object on the touch sensitive surface, wherein the touch interactor comprises a support surface for placing the touch interactor on the touch sensitive surface and an activation member for generating a user input command for the touch sensor by its movement relative to the touch sensitive surface, wherein the touch interactor comprises an active detection point for transmitting an active signal, wherein the touch sensor is configured to determine a coverage, position, orientation and/or identity of the touch interactor on the basis of the active signal, when the touch interactor is placed on the touch sensitive surface.

17 Claims, 3 Drawing Sheets

(56) References Cited

U.S. PATENT DOCUMENTS

| | | | |
|---|---|---|---|
| 2013/0037330 A1* | 2/2013 | Singh | G06F 3/0416 178/18.06 |
| 2015/0169080 A1 | 6/2015 | Choi et al. | |
| 2015/0261375 A1 | 9/2015 | Leigh et al. | |

* cited by examiner

Fig. 11

TOUCH INTERACTOR

RELATED APPLICATION

This application claims the benefit of European Application No. 17166156, filed on Apr. 12, 2017. The entire content of that application is incorporated herein by reference.

FIELD OF THE INVENTION

The present invention concerns a touch sensor and a touch interactor.

DESCRIPTION OF RELATED ART

Touch screens or more general touch sensors become more and more popular and replace classic user input devices like mouse, joystick, trackball, button, knob, etc. with a haptic user feedback. In order to enrich the haptic user experience of touch sensors, these user input devices are proposed for the use on the touch sensor. Such a user input device is placed or attached on the touch sensor and its activation is detected by the touch sensor. This avoids a wired or radio connection between a classic user input device and the device with the touch sensor or screen, because the touch sensor detects directly the activation of the touch interactor.

Touch interactors work mostly passive such that they do not need a power supply. In US2002036621 it is proposed an active knob which transmits an active signal from a peripheral point of the knob to the touch sensor such that the rotation of the knob can be detected by the rotation of the active signal on the touch screen. The energy for the active signal is harvested by photovoltaic cells from the touch screen. However, very efficient photovoltaic cells are needed to harvest in all situations sufficient energy from the touch screen to drive the touch interactor. It was identified that one problem of this solution is that the light energy harvested depends on the information displayed in the region of the photovoltaic cells. For example with a dark display image, the light energy received in the touch interactor might not be sufficient to guarantee the power supply.

The position, orientation and/or identification of touch interactors need to be detected on the touch sensor for a stable detection of the activation mechanism on the touch sensor. US2015169080 suggests to provide a pattern of conductors in the support surface of the touch interactor which can be detected and identified in the touch sensor. However, this mechanism requires much processing power to identify the patterns and is error prone to noise.

US2004/056781 discloses touch interactors on a touch sensor which emit a radio signal (RFID signal) to detect the identity and the position of the touch interactors. This solution does not provide a good detection of the position of the touch interactors.

BRIEF SUMMARY OF THE INVENTION

Therefore, it is an object to solve the problems of the state of the art.

In one embodiment, this object is achieved by means of a system, a touch interactor, a touch sensor and a method according to the independent claims.

In one embodiment, this object is achieved by a system comprising a touch sensor and a touch interactor. The touch sensor comprises a touch sensitive surface configured to detect the position of a touch of an object on the touch sensitive surface. The touch interactor comprises a support surface for placing the touch interactor on the touch sensitive surface and an activation member for generating a user input command for the touch sensor by moving the activation member relative to the touch sensitive surface. The touch interactor comprises an active detection point for transmitting an active signal to the touch sensor, when placed on the touch sensitive surface, and the touch sensor is configured to determine the coverage, position, identity and/or the orientation of the touch interactor on the basis of the active signal, when the touch interactor is placed on the touch sensitive surface.

Thus use of an active signal significantly improves the robustness of the determination of the coverage, position, orientation and/or identification. It further avoids complex pattern detection algorithms in the touch sensor.

In one embodiment, this object is achieved by a system comprising a touch sensor and an object. The touch sensor comprises a touch sensitive surface configured to detect the position of a touch of an object on the touch sensitive surface. The object comprises a support surface for placing the object on the touch sensitive surface. The object comprises an active detection point for transmitting an active signal to the touch sensor, when placed on the touch sensitive surface, and a passive detection point. The touch sensor is configured to detect the position of the active detection point and the passive detection point on touch sensitive surface, when the touch interactor is placed on the touch sensitive surface. The touch sensor is further configured to determine the identity, position, orientation and/or coverage on the basis of the position of the active detection point and the passive detection point.

This embodiment has the advantage that use of an active and a passive detection point in the object makes the points distinguishable and thus improves the detection quality and simplifies the detection algorithms.

In one embodiment, this object is achieved by a touch screen with a touch sensitive surface. The touch screen is configured to detect an object on the touch sensitive surface of the touch screen. The touch screen is further configured, when the object is detected on the touch sensitive surface, to increase or maximise the light energy emitted by the touch screen in a first region of the touch sensitive surface.

This solution allows to maximise the energy transferred to the touch interactor. This allows further to use more simple photovoltaic cells in the touch interactor.

In one embodiment, this object is achieved by a system comprising a touch sensor and a touch interactor. The touch sensor comprises a touch sensitive surface configured to detect the position of a touch of an object on the touch sensitive surface. The touch interactor comprises a support surface for placing the touch interactor on the touch sensitive surface and an activation member for generating a user input command for the touch sensor by moving the activation member relative to the touch sensitive surface.

The dependent claims refer to further advantageous embodiments of the invention.

In one embodiment, the active detection point is arranged in the flat support surface. This has the advantage that the active detection point can be immediately detected, when the touch interactor is placed on the touch sensor.

In one embodiment, the touch sensor is configured to identify the touch interactor on the basis of identification information modulated on the active signal. This has the advantage that the complex pattern algorithms for identifying a pattern in the support surface of the touch interactor is replaced by a simple transmission of identification information from the touch interactor to the touch sensor over the active signal. Identification information could comprise a unique identification information for distinguishing among different touch interactors (also of the same type) and/or a general identification information for distinguishing among different types of touch interactors.

The identity could be a unique identity for distinguishing among different touch interactors (also of the same type) and/or a general identity for distinguishing among different types of touch interactors.

In one embodiment, the position of the active detection point on the touch sensitive surface is detected on the basis of the active signal. This can be used to detect the position of the touch interactor on the touch sensitive surface.

In one embodiment, the touch interactor comprises a second detection point. Preferably, the touch sensor is configured to detect the position of the second detection point on the touch sensitive surface. Preferably, the touch sensor is configured to detect the position and/or orientation of the touch interactor on the touch sensitive surface on the basis of the position of the active detection point and of the position of the second detection point on the touch sensitive surface.

In one embodiment, the touch sensor is configured to passively detect the position of the second detection point. This combination of active detection of the position of the active detection point and the passive detection of the position of the (passive) second point makes the two points distinguishable and allow the determination of the orientation without a third point. This reduces the complexity of algorithms with higher number of points.

In one embodiment, the identity of the touch interactor is used to detect the position, the orientation, the coverage of the touch interactor on the touch sensitive surface and/or the region for detecting the movement of the activation member.

In one embodiment, the touch sensor is configured to detect a movement of the activation member and to output the user input command on the basis of the detected movement of the activation member. Preferably, the movement of the activation member and/or the output of the user input command is determined also on the basis of the determined identity and/or orientation of the touch interactor.

In one embodiment, the touch interactor physically touches or covers a first region of the touch sensitive surface, when the touch interactor is placed on the touch sensitive surface. The touch sensor is configured to detect other objects on the touch sensitive surface in a second region, when the touch interactor is placed on the touch sensitive surface.

In one embodiment, the increase or maximisation of light energy is achieved by changing the colour of the emitted light, for example to white colour. This embodiment is particularly advantageous for LCD displays for which the intensity or brightness of the emitted light is controlled by the backlight which often cannot be adjusted for sub-regions of the display. In another embodiment, the increase or maximisation of light energy is achieved by increasing or maximising the light intensity. This is for example possible in OLED displays. Both embodiments can be combined.

In one embodiment, the touch screen is particularly advantageous in a system with the touch screen and an object, e.g. the above-described touch interactor, wherein the object has a photovoltaic cell, preferably in its support surface.

In one embodiment, the first region is at least partly covered by the object. Preferably, the first region comprises at least the projection of the photovoltaic cells of the object on the display surface. Like this at least in the region of the photovoltaic cells, the light energy is maximised. Preferably, the light energy emitted by the touch screen is increased or maximised at least in the region of the touch sensitive surface which are covered the object. This is advantageous because of the stray light which reaches the photovoltaic cells from the touch screen regions around the direct coverage of the photovoltaic cells.

In one embodiment, the light energy emitted by the touch screen is increased or maximised to a predetermined value, preferably a maximum light energy which is controllable for this sub-region of the touch screen. This has the advantage that the received light energy at the object is constant and predictable.

In one embodiment, this object is achieved by a touch screen with a touch sensitive surface. The touch screen is configured to detect a object on the touch sensitive surface of the touch screen. The touch screen is further configured, when the object is detected on the touch sensitive surface, to increase or maximise the light energy emitted by the touch screen in the region of the touch sensitive surface covered by the object.

In one embodiment, the object is a touch interactor.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

A system comprises a touch sensor and a touch interactor.

Figures 1, 2:
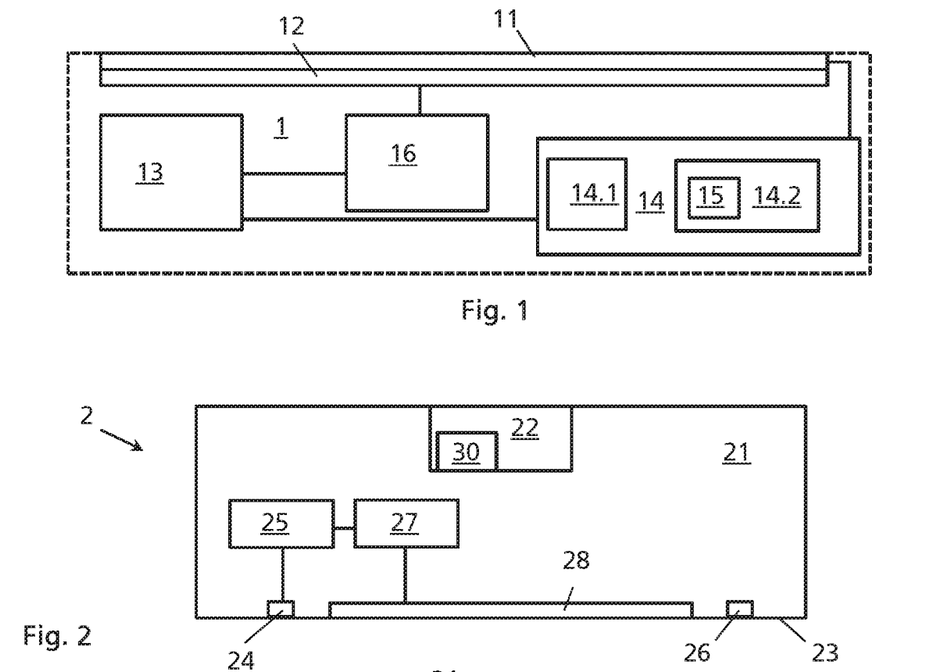
FIG. 1 shows a schematic embodiment of a touch sensor.
FIG. 2 shows a schematic embodiment of a touch interactor.

FIG. 1 shows an embodiment of a touch sensor 1.

A touch sensor 1 comprises a (preferably flat) touch sensitive surface 11 and is configured to detect the position of a touch or contact of an object like a finger, a pen or a touch interactor 2 (as described in more detail below) on the touch sensitive surface 11. A touch or a contact can be a physical contact of the object with the touch sensitive surface 11 or the presence of the object in the close vicinity of the touch sensitive surface 11 in which the presence of the object can be measured in the physical parameter measured (often called "hovering"). In one embodiment, the touch sensor 1 is a touch screen, and the touch sensitive surface 11 corresponds or overlaps (at least partly, preferably completely) with a display surface 12 of a display or screen so that information of a computer or processor can be displayed through the touch sensitive surface 11. Preferably, the display surface 12 comprises a plurality of display pixels distributed over the display surface 12. In one embodiment, the touch sensor 1 is a capacitive touch sensor 1 and is configured to detect the touch of an object on the basis of the change of a capacitance detected on the touch sensitive surface 11. However, it is also possible to use resistive or magnetic or other touch sensors 1 which detect the touch of an object on the basis of the change of a resistance or of a magnetic value detected on the touch sensitive surface 11.

In one embodiment, the touch sensor 1 (more precisely the touch sensitive surface 11) comprises a plurality of touch pixels distributed over the touch sensitive surface 11. Each touch pixel is configured to detect a physical value (preferably a capacitance) from which a touch of an object at or around the touch pixel can be determined. The touch pixels are preferably arranged in an array of first lines (in a first direction) and second lines (in a second direction, preferably perpendicular to the first direction). Preferably, the first lines are arranged parallel to each other. Preferably, the second lines are arranged parallel to each other. Preferably, each first line provides a conductive connection between all or the touch pixels in this first line, i.e. the touch pixels of this first line are conductively connected. Preferably, each second line provides a conductive connection between the or all touch pixels in this second line. Preferably, each touch pixel provides a capacitive connection between one of the first lines and one of the second lines. Therefore, each tuple of one of the first lines and one of the second lines represent (only) one touch pixel. By measuring the capacitance between one of the first lines and one of the second lines the value of the corresponding touch pixel can be measured. Each touch pixel can be identified by the corresponding first and second line. In one embodiment, the measurement of the physical value at the touch pixels, the first lines and/or second lines are performed sequentially, i.e. in subsequent distinct time windows of one sampling period. Once the detection of a touch of an object has been performed for all touch pixels, all first lines and/or all second lines, a touch frame of the measurements of all touch pixels within one sampling period is created to detect the presence and/or position of an object on the touch sensitive surface 11.

In FIG. 1, the touch sensor 1 comprises a detection section 14 connected with the touch sensitive surface 11 and configured to detect the position of a touch or contact of an object like a finger, a pen or a touch interactor 2 on the touch sensitive surface 11. The detection of objects can be passive and/or active. Preferably, the detection section 14 reads out the touch pixels (actively and/or passively) of the touch sensitive surface 11 and determines a (active and/or passive) touch frame representing a physical value at each touch pixel. The physical value indicating the presence and/or absence of an object in the vicinity of the corresponding touch pixel. This touch frame is repeatedly captured in order to obtain a movement of objects.

In one embodiment, the detection section 14 comprises a passive detection section 14.1 for passively detecting positions of an (passive) object on the touch sensitive surface 11. In one embodiment, a passive detection can be achieved by applying a driving signal on the touch pixels of a first line and by measuring (sequentially or at the same time) the output of the second lines. The output of the second lines changes, where an object like a finger or a metallic object is present at the touch pixel(s) at the intersection(s) of the driven first line and the measured second line. The measurements of the output of the second lines for the subsequent application of the driving signal in each first line can be collected in a passive touch frame. The passive touch frame can be used as basis for detecting the presence of a passive object. Therefore, the passive detection section 14.1 comprises preferably a driving circuit and a sensing circuit. The driving circuit is connected with the first lines for sequentially applying a driving signal at the first lines. The sensing circuit is connected with the second lines for measuring for each driven first line the output of all second lines. Preferably, the sensing circuit comprises at least one charge sensor and at least one digital to analogue converter.

In one embodiment, the detection section 14 comprises an active detection section 14.2 for detecting a position of an (active) object on the basis of an active signal transmitted from the (active) object. The active detection is achieved by receiving on the touch sensitive surface 11 an active signal from the object. Preferably, the active signal from the object is transmitted through the first line(s) and the second line(s) being closest to the point of the object which transmits the active signal to the touch sensor 1. By measuring (in one sampling period) the output at the first lines and the second lines, the location of the active object can be detected. Such an active signal is for example transmitted from an active detection point, e.g. the tip of an active pen as an object. This allows to detect the position of active detection point with higher accuracy. The output of the first lines and second lines in one sampling period could be measured to determine an active touch frame. The active signal transmitted from a transmission point of the active object origins from the active object. This can be achieved by generating the active signal in the active object and applying the active signal at this transmission point. Alternatively, it is also possible to receive at the active object an input signal from the touch sensor 1, process the received input signal in the active object and retransmit the processed input signal as active signal at the transmission point of the active object. Preferably, the transmission of the active signal from the active object to the (touch pixels of the) touch sensor 1 works by magnetic and/or capacitive coupling. This distinguishes from the emission of an electromagnetic wave like a radio wave. The electromagnetic waves emitted from an emission source (normally an antenna) once generated continue to travel, even if generating emission source is switched off. Due to the separation of the electromagnetic waves from its source and its propagation, the electromagnetic waves can be detected also outside of the range of the electromagnetic field created by its source. In contrary, the magnetic and/or capacitive field of magnetic and/or capacitive coupling does not separate and/or propagate as an electromagnetic wave from its source. The active detection section 14.2 comprises preferably a first sensing circuit connected with the first lines for measuring the output of all first lines in one sampling period and a second sensing circuit connected with the second lines for measuring the output of all second lines in one sampling period.

In one embodiment, the active detection section 14.2 comprises an information demodulation section 15 for demodulating information from the active object modulated on the active signal. This allows transmitting more complex information from the object than the information of the position and/or form of the object. An example of transmitted information would be the tip pressure of a pen measured in the pen. The information modulated on the active signal can be modulated by any modulation technology, e.g. amplitude modulation (including amplitude shift-keying), frequency modulation (including frequency shift-keying), phase modulation (including phase shift-keying), combinations of those (including quadrature amplitude modulation), and others. The information demodulation section 15 can use common demodulation technology or any other technology to retrieve the modulated information from the active signal.

In an embodiment, the touch sensor 1 is configured to detect objects passively and actively, i.e. the detection section 14 comprises a passive detection section 14.1 and an active detection section 14.2. In one embodiment, a sampling period has a distinct active object detection period for detecting a position of an active object on the basis of an active signal transmitted from the active object and a passive object detection period for detecting a position of a passive object. In one embodiment, a passive touch frame is measured during the passive object detection period and an active touch frame is measured during the active object detection period. The active object detection period and the passive object detection period could be two subsequent detection periods or could each comprise multiple active object detection sub-periods and multiple passive object detection sub-periods in one sampling period which alternate or interleave. In one embodiment, the active signal is transmitted from the transmission point continuously, i.e. during the active object detection period and the passive object detection period of one sampling period. However, it is also possible to transmit the active signal from the transmission point selectively such that the transmission of the active signal is paused during the passive object detection period. In one embodiment, the active signal is transmitted from the transmission point continuously, i.e. during the active object detection period and the passive object detection period of one sampling period. In one embodiment, the sensing circuit of the passive detection section 14.1 and the second sensing circuit of the active detection section 14.2 could be the same, in particular if the active signal is the same as the driving signal. In one embodiment, the sensing circuit of the passive detection section 14.1 and the second sensing circuit of the active detection section 14.2 are distinct, in particular if the active signal is different from driving signal. In a preferred embodiment, the sensing circuit of the passive detection section 14.1 and the second sensing circuit of the active detection section 14.2 are at least partly distinct (and might use some common circuitry).

The touch sensor 1 comprises further a processor 13 with different functionalities. The processor 13 could be one general component combining several different functionalities and/or could comprise distinct specific components with distinct functionalities. The functionalities of the processor 13 are described later.

FIG. 2 shows a schematic example of a touch interactor 2. The touch interactor 2 comprises an activation member 22. The activation member 22 is configured to be moved (translated and/or rotated) with respect to the touch sensitive surface 11. The activation member 22 is further configured such that the touch sensor 1 can detect the movement of the activation member 22. This is realized by the touch sensor 1 detecting (directly) the movement of the activation member 22 on the basis of the sequential positions and/or orientations of the activation member 22 (relative to the touch sensor 1) on the touch sensitive surface 11. The movement of the activation member 22 is detected by detecting the position (translationally and/or rotationally) of the activation member 22 in the (active and/or passive) touch frame determined by the detection section 14. In one embodiment, the touch interactor 2 comprises a support structure 21 in which the activation member 22 is movably supported. The touch interactor 2, preferably the support structure 21, comprises a, preferably flat, support surface 23 for placing the touch interactor 2 on the touch sensitive surface 11. The support surface 23 is configured such, in particular large enough, that the touch interactor 2 can be placed with the support surface 23 on the touch sensitive surface 11 in a stable position (when the touch sensitive surface 11 is in a horizontal position). A stable position means that the placed touch interactor 2 does not turn over or wobble under small shocks. For example the most distant supporting points of the support surface 23 should have a distance which is at least 30%, preferably 50%, preferably 70% of the largest diameter of the touch interactor 2 in a (parallel) direction of a plane the touch sensitive surface 11. The support surface 23 is preferably a plane surface, but could also be constituted by a number of support points.

In one embodiment, the touch interactor 2 comprises an active detection point 24, preferably in the support surface 23. The active detection point 24 is configured to apply an active signal which can be detected in the touch sensitive surface 11 of the touch sensor 1. Preferably, the active signal is generated in a signal generator 25 in the touch interactor 2. Alternatively, it is also possible to receive a signal from the touch sensor 1, process the signal in the touch interactor 2 and apply the processed signal as active signal at the active detection point 24. Preferably, the active signal is continuously transmitted such that the touch interactor 2 does need no synchronization with the active detection period of the touch sensor 1. Continuously means here without interruption at least in one sampling period.

In one embodiment, the touch interactor 2 comprises a second detection point 26. Preferably, the second detection point 26 is passive (does not transmit an active signal). This has the advantage that the active detection point 24 and the passive second detection point 26 are distinguishable and allow the touch sensor 1 by detecting the position of the active detection point 24 and of the passive point 26 a full determination of the orientation and position of the touch interactor 2 on the touch sensitive surface 11. However, it is also possible to realize the second detection point 26 as active detection point.

The active detection point 24 and/or the second detection point 26 are arranged such in the touch interactor 2 that the touch sensor 1 is able to determine the position and orientation of the touch interactor 2 from the position of the points 24 and 26. Mainly, the points 24 and 26 should not change their position in a direction of the support surface, when the activation member 22 is activated or moved.

In one embodiment, the active signal transmitted from the active detection point 24 comprises identification information of the touch interactor 2. Preferably, this identification information is modulated on the active signal as explained in more detail above. This allows the touch sensor 1 to quickly identify a touch interactor 2 on the touch sensitive surface 11. Identification information could comprise a unique identification information and/or a general identification information. The general identification information is configured for distinguishing among different types of touch interactors with common characteristics. There might be two touch interactors with the same general identification information. The unique identification information like an ID is configured for distinguishing among different touch interactors (also of the same type). There is only one touch interactor transmitting the same unique identification information. However, it is also possible to identify the touch interactor 2 on the basis of a pattern of detection points 24, 26. For example a distance of the points 24 and 26 could indicate the identity of the touch interactor 2. It is also possible to have a pattern of three or more points.

In one embodiment, the activation member 22 comprises an activation detection point 30 which can be detected by the touch sensitive surface 11, when the activation detection point 30 is in the vicinity of the touch sensitive surface 11. The movement of the activation member 22 is detected by detecting the position (translationally and/or rotationally) of the activation detection point 30 in the (active and/or passive) touch frame determined by the detection section 14. Since the activation detection point 30 varies the physical value, preferably the capacitance, at the touch pixels in the vicinity of the activation detection point 30, the position of the activation detection point 30 can be detected in each touch frame, when the touch interactor 2 is placed on the touch sensitive surface 11. The position, form and/or size of the activation detection point 30 is such that the touch sensor 1 can detect the movement of the activation member 22 on the basis of the detection of the movement of the activation detection point 30. The potential movement of the activation member 22 and/or of the activation detection point 30 covers a certain detection area 29 on the touch sensitive surface 11, when the touch interactor 2 is placed on the touch sensitive surface 11 (or on the plane of the support surface 23). The activation detection point 30 could comprise several distinct activation detection points. The activation detection point 30 could be passive or active. A passive activation detection point 30 could be made of any material which changes the physical value measured in the touch sensitive surface 11. This could be a conductive material, a magnetic material, etc. Preferably, a conductive material is used which is conductively connected with an activation surface of the activation member 22. The activation surface comes in contact with a user, when the activation member 22 is activated such that the capacity of the user is connected with the activation detection point 30. In order to improve the detection quality, the activation detection point 30 could be active and transmit an active signal as explained above for the active detection point 24. Therefor, the activation detection point 30 could be connected to the signal generator 25 for applying the active signal on the activation detection point 30. The same active signal could be used for the active detection point 24 and the detection point 30. For certain touch interactors 2, it is also possible that the active detection point 24 is arranged in the activation member 22 and fulfils the function of the active detection point 24 and of the activation detection point 30.

In one embodiment, the touch interactor 2 comprises a sensor for sensing sensing information and is configured to transmit the sensing information with the active signal of the active detection point 24 to the touch device 1. As described above, preferably, the sensing information is modulated on the active signal (in addition or alternatively to the identification information). In one embodiment, the sensing information is a state of the touch interactor 2 or of the activation member 22. Such a state of the activation member 22 could be, if the activation member 22 is activated (button on or off, trackball moving or not, joystick in or out of rest position), in which activation state the activation member 22 has. Another state of the activation member 22 or of the touch interactor 2 could be, if the activation member 22 or the touch interactor 2 is touched or not. This could be sensed by a capacitive sensor in the touch interactor 2. A state of the touch interactor 2 could be the orientation of the touch interactor 2. Sensing information relating to the activation, movement orientation and/or position of the activation member 22 is also referred as activation information. A further sensing information could be an authentication of the user of the touch interactor 2, e.g. the finger print. This could be detected by an authentication sensor like a fingerprint sensor. The authentication check could also be done in the touch interactor 2 such that only a binary information like approved or rejected is sent with the active signal to the touch device 1.

Figure 7:
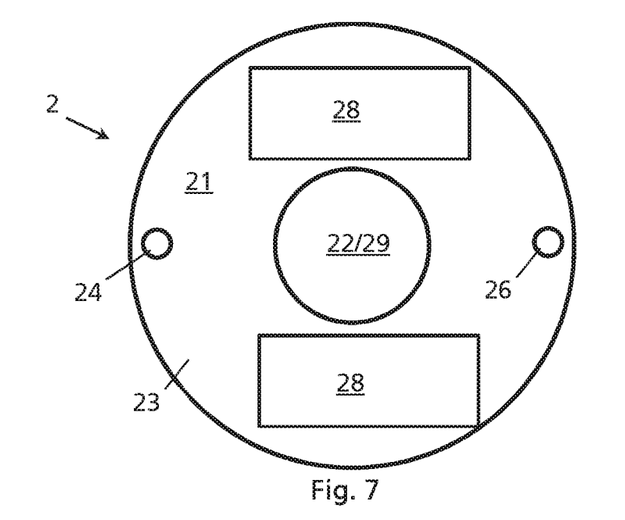
FIG. 7 shows a schematic embodiment of a support surface of a touch interactor.

In one embodiment, the touch interactor 2 comprises a power source. The power source could comprise a battery 27. Alternatively or additionally, the power source could comprise a photovoltaic cell 28 for transforming light energy into power for supplying power to the touch interactor 2 and/or for charging the battery 27. Preferably, the photovoltaic cell 28 is arranged in the support surface 23 of the touch interactor 2 as shown in FIG. 7. The photovoltaic cell could comprise several distinct areas with photovoltaic cells. The photovoltaic cell 28 is arranged such that, when the touch interactor 2 is placed on the touch sensitive surface 11, the photovoltaic cell 28 receives the light emitted by the display surface 12.

Figure 8:
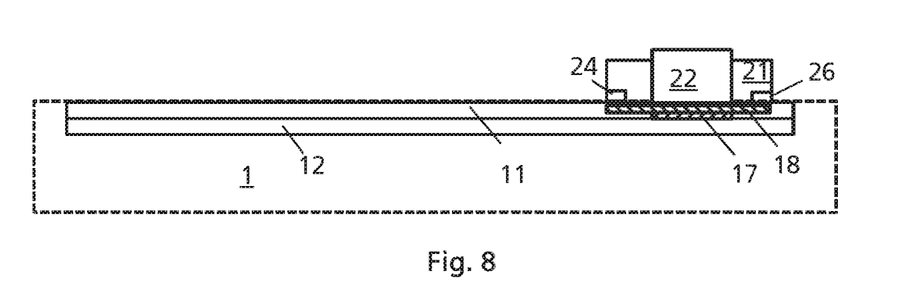
FIG. 8 shows a schematic embodiment of a system with a touch sensor and touch interactor with an active detection point.

FIG. 8 shows an example of a system with the touch interactor 2 placed on the touch sensitive surface 11 of the touch sensor 1. When the touch interactor 2 is placed on the touch sensitive surface 11, the touch sensor 1 or the controller 13 is configured to determine the identity, the position and/or the orientation of the touch interactor 2 on the touch sensitive surface 11.

In a preferred embodiment, the identity of the touch interactor 2 is determined from the active detection point 24, preferably from the identification information modulated on the active signal transmitted from the active detection point 24. However, alternative embodiments to determine the identity as from a pattern of detection points are also possible. Once the identity of the touch interactor 2 is determined, it is possible to determine the characteristics of the touch interactor 2. This can be realized by a look-up table. The characteristics are for example the arrangement of the detection points 24, 26 and/or 30 in the touch interactor 2 and/or the functionality provided by the touch interactor 2 and/or the possible movement of the activation member 22. The identity is for example the type of touch interactor 2 used and/or its ID.

In one embodiment, the position of the touch interactor 2 is determined on the basis of the position of the active detection point 24 on the touch sensitive surface 11. If the touch interactor 2 is rotationally symmetric and the active detection point 24 is arranged in the centre point of (a cross-sectional plain parallel to or in the support surface 23 of) the touch interactor 2, only the active detection point 24 is necessary to determine the position of the touch interactor 2 on the touch sensitive 11. Otherwise the position of the second detection point 26 is necessary to determine the position of the touch interactor 2.

In one embodiment, the orientation of the touch interactor 2 is determined on the basis of the position of the active detection point 24 on the touch sensitive surface 11. If the active detection point 24 is formed asymmetrically, only the active detection point 24 is necessary to determine the orientation of the touch interactor 2 on the touch sensitive 11. Preferably, also the position of the second detection point 26 is used to determine the orientation of the touch interactor 2. If the second detection point 26 is passive, the two detection points 24 and 26 are distinguishable and two points are sufficient to detect the orientation of the touch interactor 2.

In a preferred embodiment, when the touch interactor 2 is placed on the touch sensitive surface 11, the position of the active detection point 24 and the second detection point 26 are determined for determining the position and/or orientation of the touch interactor 2. As described before, preferably, the position of the active detection point 24 is detected from the active touch frame and/or in the active object detection period and/or the position of the second detection point 26 is detected from the passive touch frame and/or in the passive object detection period.

In one embodiment, the controller 13 is configured to detect the activation, movement and/or position of the activation member 22. In one embodiment, the movement and/or position of the activation member 22 is detected in the touch sensitive surface 11, e.g. by detecting the position of an activation detection point 30 in the pixels of the touch sensitive surface 11. With the identity, position and/or orientation, the controller 13 knows an activation region 17 on the touch sensitive surface 11, where the activation member 22 moves over the touch sensitive surface 11 (corresponding to the region 29 of the touch interactor 2). With the identity, position and/or orientation, the controller 13 could know the type of movement of the activation member 22 or the activation detection point 30 in the activation region 17 and improve the detection quality with this knowledge. In another embodiment, it is also possible to detect the activation and/or movement and/or position of the activation member 22 on the basis of activation information modulated on the active signal transmitted from the activation detection point 30 and/or the active detection point 24.

In one embodiment, the controller 13 is configured to determine the coverage 18/19 of the touch interactor 2 on the touch sensitive surface 11/on the display surface 12, the coverage of the photovoltaic cells 28 on the display surface 12, the activation region 17/29 of the activation member or other relevant information on the basis of the identity of the touch interactor 2 and/or or the position of the active detection point 24 and/or of the second detection point 26. The coverage of the touch interactor 2 or the photovoltaic cells 28 is preferably the projection of the touch interactor 2 or the photovoltaic cells 28 on the touch sensitive surface 11 or the display surface 12.

The touch sensor 1 is further configured to treat simultaneously at least two touch interactors 2. Simultaneously could mean also sequentially, but still in the same sampling period. Treating means to do at least one of the following actions for each of the at least two touch interactors (not necessarily the same action): determine identity, position and/or orientation of the two touch interactors 2; determine the activation, movement and/or position of the activation member 22. The at least two touch interactors 2 can be synchronized between each other.

The described embodiment of determining the identity, the position and/or orientation can also be applied for any other object with a support surface and is not limited to touch interactors 2.

In one embodiment, the controller 13 is configured to generate a user input command on the basis of the detected movement of the activation member. Preferably, the generated user input command depends on the detected movement of the activation member 22 and on the identity of the touch interactor 2.

The touch sensor 1 is configured to detect multiple objects present on the touch sensitive surface 11. When the touch interactor 2 is placed on the touch sensitive surface 11 in a first region 18, the remaining second region of the touch sensitive surface 11 can detect other touch interactors 2 or other objects as described above.

FIGS. 3 to 6 show different types of touch interactors.

Figure 3:
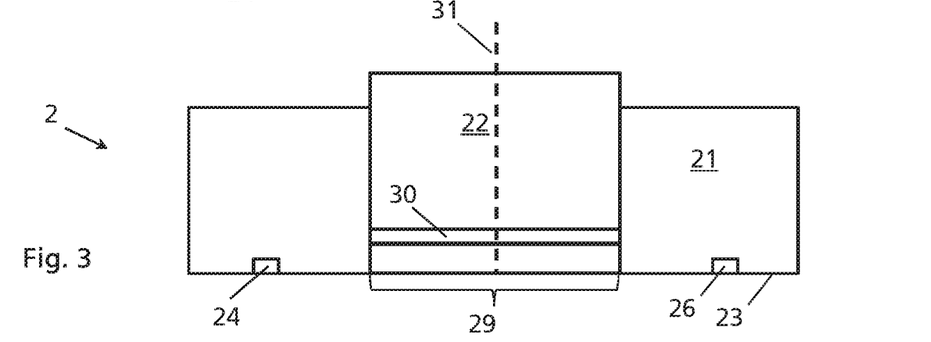
FIG. 3 shows a schematic embodiment of a touch interactor with a button functionality.

FIG. 3 shows a button, wherein the activation member 22 can be (translatively) moved along the direction 31 in the support structure 21. The direction 31 is perpendicular to the support surface 23 or to the touch sensitive surface 11. The activation member 22 comprises on the (bottom) side facing the touch sensitive surface 11 (when the touch interactor 2 is placed with the support surface 23 on the touch sensitive surface 11) the activation detection point 30 which can be detected in the touch sensitive surface 11. When the activation member 22 is moved towards the touch sensitive surface 11, the detection member 30 creates a stronger detection signal in the touch sensitive surface 11 and the touch sensor 1 detects the activation of the activation member 22 or the button. If the activation detection point 30 is active, it is also possible to switch the active signal of the activation detection point 30 on or off by the movement of the activation member 22. For example, the movement of the button 22 to the touch sensitive surface 11 could create after a certain threshold movement a contact between the activation detection member 30 and the signal generator 25. When the touch interactor 2 is placed on the touch sensitive surface 11, the position, the orientation and/or the identity of the touch interactor 2 are/is determined. Here the active detection point 26 and the second detection point 26 are arranged in the support structure 21. However, it is also possible to arrange the active detection point 24 and/or the second detection point 26 in the (bottom surface of the) activation member 22 instead of or in addition to the activation detection member 30. If the active detection point 24 and/or the second detection point 26 replace the activation detection point 30, the active detection point 24 and/or the second detection point 26 have also the function of the activation detection point 30. For example, only one active detection point 24 in the activation member 22, preferably in the centre of the touch interactor 2 working as well as activation detection point 30 could be sufficient to detect position, identity and the movement of the activation member 22 of the touch interactor 2.

Figure 4:
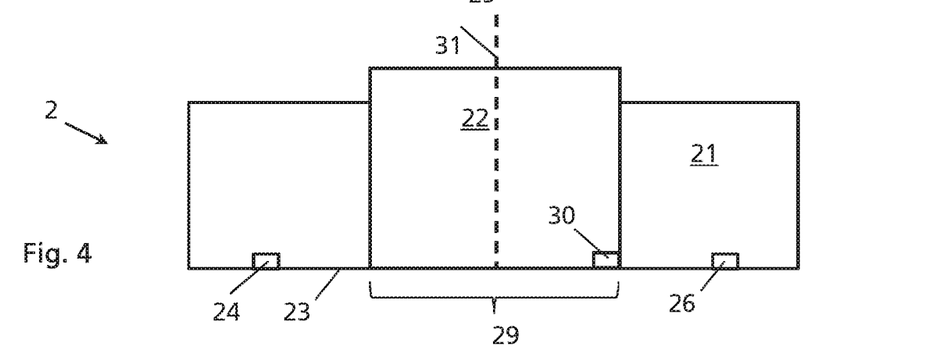
FIG. 4 shows a schematic embodiment of a touch interactor with a knob functionality.
Figure 5:
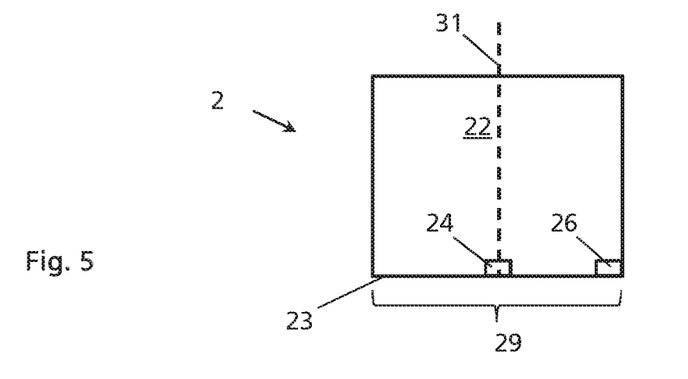
FIG. 5 shows another schematic embodiment of a touch interactor with a knob functionality.

FIG. 4 shows a knob, wherein the activation member 22 can be (rotatively) moved or rotated around the direction 31 in the support structure 21. The direction 31 is perpendicular to the support surface 23 or to the touch sensitive surface 11. The activation member 22 comprises on the bottom side (when the touch interactor 2 is placed with the support surface 23 on the touch sensitive surface 11) the activation detection point 30 which can be detected in the touch sensitive surface 11. When the activation member 22 is rotated the touch sensitive surface 11, the detection member 30 moves on a circle and the touch sensor 1 can detect the activation of the activation member 22 or the knob on the basis of the position of the activation detection point 30. When the touch interactor 2 is placed on the touch sensitive surface 11, the position, the orientation and/or the identity of the touch interactor 2 are/is determined. Here the active detection point 26 and the second detection point 26 are arranged in the support structure 21. However, it is also possible to arrange the active detection point 24 and/or the second detection point 26 in the (bottom surface of the) activation member 22 instead of or in addition to the activation detection member 30. If the active detection point 24 or the second detection point 26 replaces the activation detection point 30, the active detection point 24 or the second detection point 26 have also the function of the activation detection point 30. For example, one of the active detection point 24 and the second detection point 26 in the centre point of the rotation of the activation member 22 and the other replacing the activation detection point 30 could be sufficient to detect position and orientation of the activation member 22 and the identity of the touch interactor 2 and the movement of the activation member 22 of the touch interactor 2. In this case, the support structure 21 is not necessary as shown in FIG. 5.

It is also possible to combine the functionalities of the touch interactors 2 of the FIGS. 3 and 4 in a touch interactor 2 with a knob and button functionality, if the activation member 22 in FIG. 4 can be rotatively and translatively moved in the support structure 21. The activation member 22 in FIG. 4 is rotatable around the direction 31 and movable along the direction 31 a knob and a button can be achieved with the same activation member 22. An alternative combination of a knob and a button could be achieved by the embodiment in FIG. 3, wherein the support structure 21 acts as activation member for the knob as described in FIG. 5 and the activation member 22 acts as activation member for the button.

Figure 6:
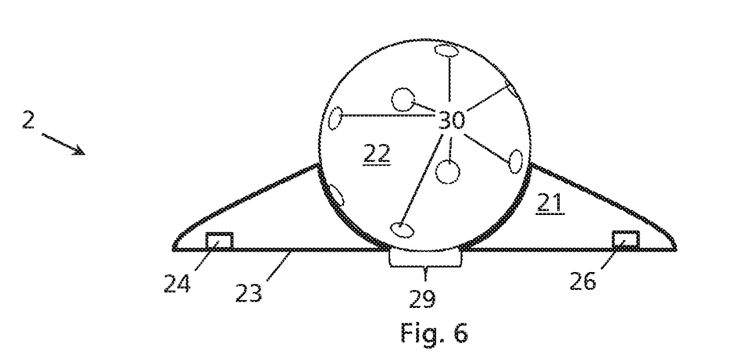
FIG. 6 shows a schematic embodiment of a touch interactor with a trackball functionality.

FIG. 6 shows the embodiment of a trackball as a touch interactor 2. The activation member 22 is a ball which is rotatably supported in the support structure 21 around the centre point of the ball. The activation detection points 30 are (equally) distributed over the ball. When the touch sensor 1 identifies the touch interactor 2 as trackball and detects the activation region 29 or 17 from the position of the active detection point 24 and the second detection point 26, the touch sensor 1 could start an algorithm to determine from the movement of the activation detection points 30 (equally) in the activation region 29 or 17 the rotation (direction and velocity) of the ball. A user input command is generated on the basis of the present position or movement of the ball.

Other touch interactors 2 are possible like a joystick, a keyboard, number pad, etc.

In one embodiment, the touch screen 1 and/or the controller 13 is configured to detect the presence of a touch interactor 2 on the touch sensitive surface 11 and to increase or maximise the light energy emitted by the display surface 12 in a first region 19 of the display surface 12.

In one embodiment, the presence is detected on the basis of the touch sensitive surface 11. In one embodiment, the identity of the touch interactor 2 or the object is determined, e.g. as described above, and checked, if the touch interactor 2 or the object has photovoltaic cells 28 as described above. The above mentioned characteristics related to the identity of the touch interactor 2 could include the information about the photovoltaic cells 28. This could also include the information, where the photovoltaic cells 28 are located. If the check results that the touch interactor 2 or the object has photovoltaic cells 28 as described above, the light energy is increased or maximised in the first region 19 as described in more detail below.

Figure 9:
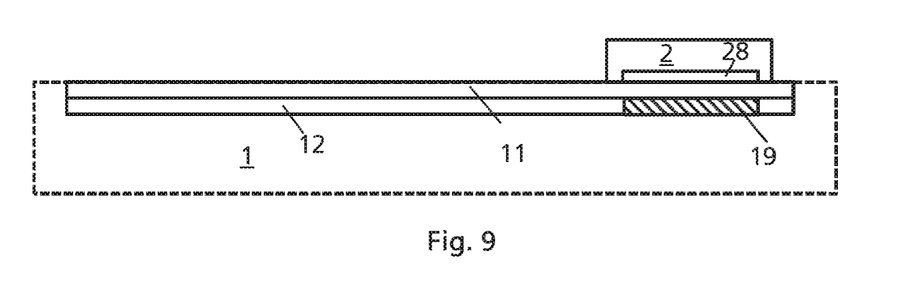
FIG. 9 shows a schematic embodiment of a system with a touch screen with a first example of a region of maximized/increased light energy and touch interactor with a photovoltaic cell.
Figure 10:
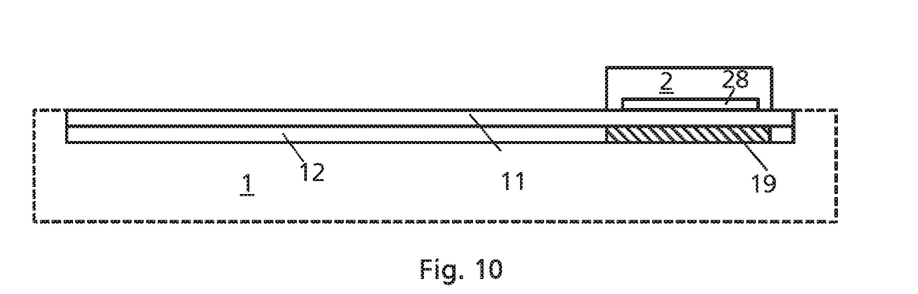
FIG. 10 shows a schematic embodiment of a system with a touch screen with a second example of a region of maximized/increased light energy and touch interactor with a photovoltaic cell.
Figure 11:
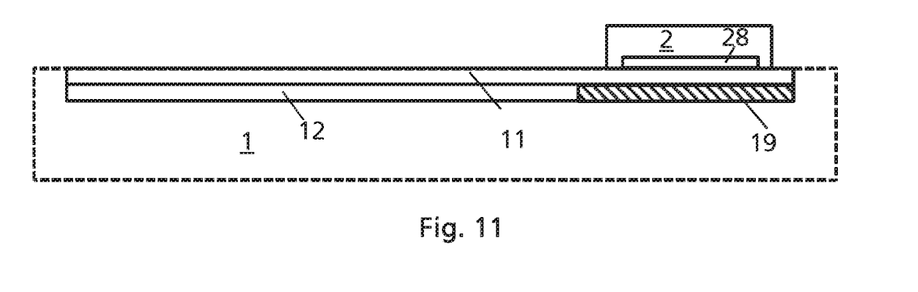
FIG. 11 shows a schematic embodiment of a system with a touch screen with a third example of a region of maximized/increased light energy and touch interactor with a photovoltaic cell.

In one embodiment, when the presence of a touch interactor 2 on the touch sensitive surface 11 or the display surface 12, the light energy emitted by the display surface 12 is increased or maximised in the first region of the display surface 12. In one embodiment, a remaining second region of the display surface 12 continues to display the information as received from the controller 13. In one embodiment, the first region 19 is at least partly covered by the detected touch interactor 2 or object so that the light energy for the photovoltaic cells 28 of the touch interactor 2 can be maximised or increased. In one embodiment as shown in FIG. 9, the first region 19 is defined by the projection of the photovoltaic cells 28 of the object on the touch display 12. In a preferred embodiment, the first region 19 is defined by comprising at least the projection of the photovoltaic cells 28 of the object on the touch display 12. In one embodiment as shown in FIG. 10, the first region 19 is defined by the projection of the touch interactor 2 or of the object on the touch display 12. In one embodiment as shown in FIG. 11, the first region 19 is defined by comprising at least the projection of the touch interactor 2 or of the object on the touch display 12. This could be achieved by a adding a predetermined border width around the projection of the touch interactor 2 or of the object on the touch display 12. When the touch interactor 2 is displaced on the touch sensitive surface 11, the displacement is detected and the first region 19 is displaced accordingly with the displacement of the touch interactor 2.

There are different ways to maximise the light energy of the first region. In one embodiment, the colour of the display pixels in the first region is changed such that the light energy emitted by all display pixels in the first region is increased or maximised. The colour blue includes more light energy than the colour red. Since the colour white is the superposition of all colours, it has the maximum light energy. Therefore, the light energy emitted by the touch pixels in the first region can be increased by setting the display pixels in the first region to white or another colour with a high energy value. This is in particular advantageous for displays for which the light intensity or brightness cannot be controlled for single pixels or other subregions of the display. This is the case for LCD displays with a common backlight which controls the brightness. In another embodiment, the brightness in the first region can be increased or maximised in order to increase or maximise the emitted light energy. For example, OLED displays allow to control the brightness of each pixel. In a preferred embodiment, the light energy emitted from the first region is increased or maximised by changing the colour and the brightness.

The described embodiment for adapting the light energy is in particular advantageous in combination with touch interactors 2 and/or the described determination of the position, orientation and/or identity, but could be applied for any other object with photovoltaic cells, in particular objects with photovoltaic cells in a support surface.

The invention claimed is:

1. System comprising a capacitive touch sensor and a touch interactor, wherein the touch sensor comprises a touch sensitive surface configured to detect the position of a touch of an object on the touch sensitive surface, wherein the touch interactor comprises a support surface for placing the touch interactor on the touch sensitive surface and an activation member for generating a user input command for the touch sensor by its movement relative to the touch sensitive surface, characterized in that the touch interactor comprises an active detection point for transmitting an active signal, the touch sensor is configured to determine a coverage, position, orientation and/or identity of the touch interactor on the basis of the active signal, when the touch interactor is placed on the touch sensitive surface, wherein the touch sensor comprises an active detection section for detecting an active signal from an object in the vicinity of one or more of the touch pixels and for detecting a position of a source of the active signal of the object on the touch sensitive surface, and a passive detection section for passively detecting a position of an object on the touch sensitive surface.

2. System according to claim 1, wherein the active detection point is arranged in the support surface.

3. System according to claim 1, wherein the touch sensor is configured to determine the identity of the touch interactor on the basis of identification information modulated on the active signal.

4. System according to claim 1, wherein the touch sensor is configured to detect the position of the active detection point on the touch sensitive surface on the basis of the active signal.

5. System according to claim 4, wherein the touch sensor is configured to detect the position of the touch interactor on the touch sensitive surface on the basis of the position of the active detection point on the touch sensitive surface.

6. System according to claim 4, wherein the touch interactor comprises a second detection point, wherein the touch sensor is configured to detect the position of the second detection point on the touch sensitive surface.

7. System according to claim 6, wherein the touch sensor is configured to detect the coverage, position and/or orientation of the touch interactor on the touch sensitive surface on the basis of the position of the active detection point and of the position of the second detection point on the touch sensitive surface.

8. System according to claim 6, wherein the second detection point is a passive detection point, and/or the touch sensor is configured to passively detect the position of the second detection point.

9. System according to claim 1, wherein the touch sensor is configured to detect the coverage, position and/or orientation of the touch interactor on the touch sensitive surface on the basis of the identity of the touch interactor.

10. System according to claim 1, wherein the activation member comprises an activation detection point, wherein the touch sensor is configured to detect a movement of the activation detection point in the touch sensitive surface, wherein the touch sensor is configured to detect a movement of the activation member on the basis of the movement of the activation detection point.

11. System according to claim 1, wherein the touch sensor is configured to detect a movement of the activation member and to output the user input command on the basis of the detected movement of the activation member and on the basis of the determined identity and/or orientation of the touch interactor.

12. System according to claim 1, wherein the touch interactor comprises a support structure for movably supporting the activation member.

13. System according to claim 1, wherein the touch sensitive surface comprises a plurality of touch pixels, wherein each touch pixel is configured to detect a physical value being a capacitance for the detection of an object in the vicinity of the corresponding touch pixel.

14. System according to claim 13, wherein the activation member comprises an activation detection point, wherein the touch sensor is configured to detect a movement and/or position of the activation member of the touch interactor in the touch sensitive surface by detecting the position of the activation detection point in the touch pixels of the touch sensitive surface.

15. System according to claim 14, wherein the active detection point is arranged in the activation member and fulfils the function of the active detection point and of the activation detection point.

16. System according to claim 13, wherein the touch pixels are arranged in an array of first lines in a first direction and second lines in a second direction, wherein the passive detection section is configured to passively detect the position of an object by applying a driving signal on the touch pixels of a first line and by measuring the output of the second lines.

17. Method for detecting on a touch sensitive surface of capacitive touch sensor a touch interactor with a support surface and an activation member, the touch sensor comprising an active detection section for detecting an active signal from an object in the vicinity of one or more of the touch pixels and for detecting a position of a source of the active signal of the object on the touch sensitive surface, and a passive detection section for passively detecting a position of an object on the touch sensitive surface, the method comprising the following steps:

receiving on the touch sensitive surface an active signal transmitted from the touch interactor;

determining in the touch sensor the identity of the touch interactor and/or the orientation of the touch interactor on the touch sensitive surface, when the touch interactor is placed on the touch sensitive surface;

detecting on the touch sensitive surface a movement of the activation member of the touch interactor and generating in the touch sensor a user input command on the basis of the detected movement and the determined identity and/or orientation.

* * * * *